Nov. 23, 1943.  E. R. DETRICK  2,334,811
TRIM PANEL
Filed July 29, 1940  4 Sheets-Sheet 1
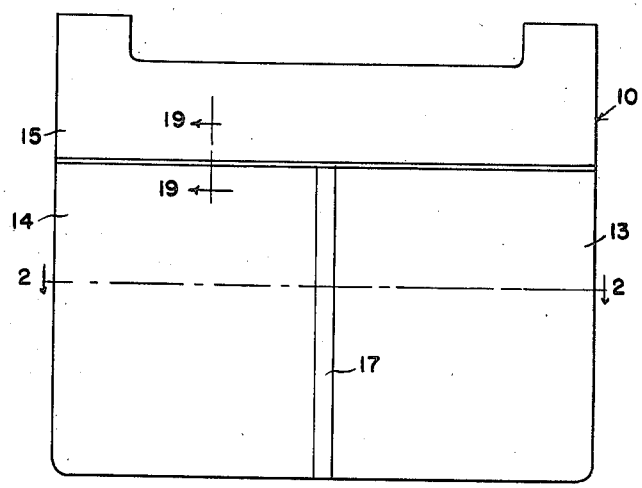
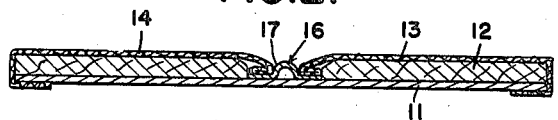
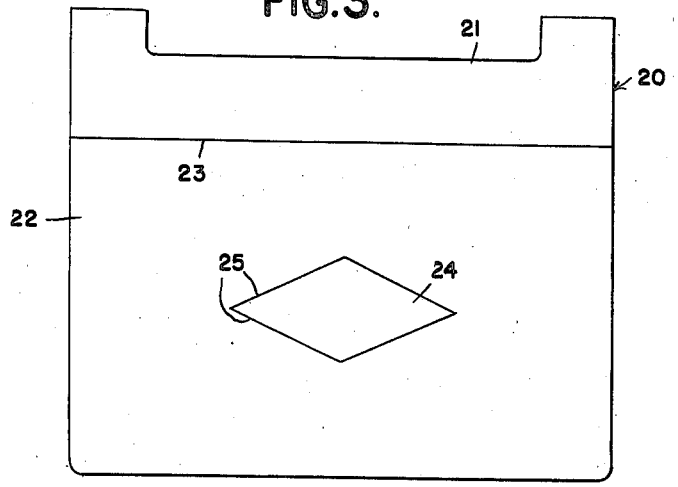
INVENTOR.
EDWARD R. DETRICK
BY Whittemore, Hulbert
& Belknap  ATTORNEYS Nov. 23, 1943.    E. R. DETRICK    2,334,811
TRIM PANEL
Filed July 29, 1940    4 Sheets-Sheet 2

INVENTOR.
EDWARD R. DETRICK
BY Whittemore, Hulbert
& Belknap ATTORNEYS

Nov. 23, 1943.  E. R. DETRICK  2,334,811
TRIM PANEL
Filed July 29, 1940  4 Sheets-Sheet 3

INVENTOR.
EDWARD R. DETRICK
BY Whittemore, Hulbert
& Belknap ATTORNEYS

Nov. 23, 1943.    E. R. DETRICK    2,334,811
TRIM PANEL
Filed July 29, 1940    4 Sheets-Sheet 4
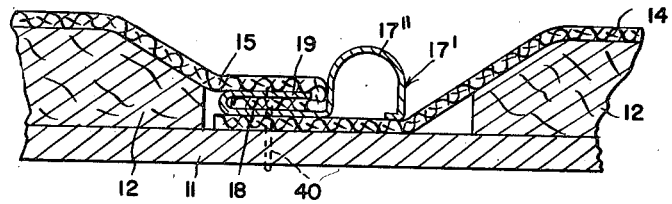
FIG.19.
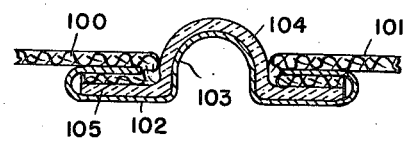
FIG.20.
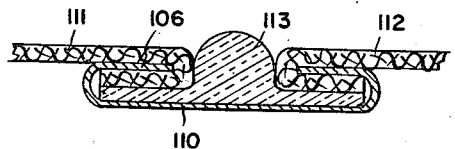
FIG.21.
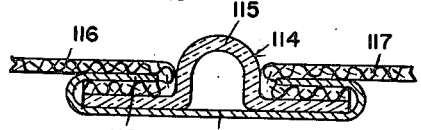
FIG.22.
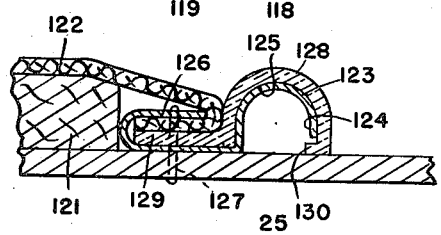
FIG.23.
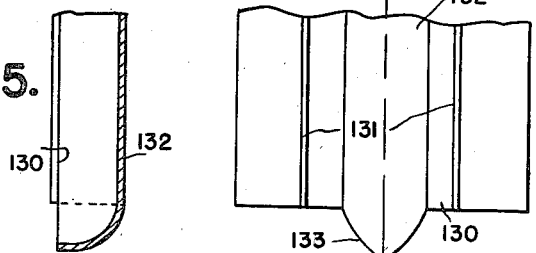
FIG.25.    FIG.24.
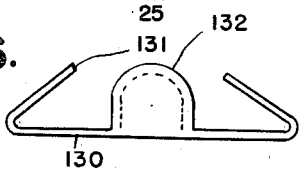
FIG.26.
INVENTOR.
EDWARD R. DETRICK
BY Whittemore, Hulbert
& Belknap ATTORNEYS Patented Nov. 23, 1943

2,334,811

UNITED STATES PATENT OFFICE 2,334,811

TRIM PANEL

Edward R. Detrick, Detroit, Mich., assignor to National Automotive Fibres, Inc., Detroit, Mich., a corporation of Delaware Application July 29, 1940, Serial No. 348,291

22 Claims. (Cl. 45—138)

The present invention relates to trim panels and more particularly to a novel trim covered panel which offers the possibility of a wide variety of decorative effects.

It has been suggested in the past to cover trim panels and other interior trim of automotive vehicles with fabrics of different colors or shades so as to provide a two-tone or multiple-tone effect. In the past this has been accomplished by sewing the two fabrics together to provide a composite fabric, which may then be applied to trim panels or other interior portions of the vehicle. The sewed seam between the two different fabrics presented an unattractive appearance, and efforts were made to conceal this seam in the past. One manner of concealing the seam was to provide a metal molding strip which was tacked through the fabric to the panel board and was intended to overlie and conceal the seam. Obviously the seam had to be perfectly straight, and while there was no difficulty in sewing straight seams, application of the composite fabric to the panel board had to be carried out with extreme care, so that the seam could be covered by a narrow strip of molding metal.

According to the present invention, two pieces of fabric which are to be united for a composite interior trim fabric are connected by means of a metal strip of a particular design, as will subsequently be pointed out. As a result, this strip insures that the seam or line of juncture between the pieces or fabric will be straight both before and after the composite fabric has been applied to the panel board.

In addition, this metal strip serves as a reinforcing means for the panel, so that by employing my improved construction it is possible to use a lighter and therefore less expensive foundation panel board.

A number of different effects may be obtained by slightly modified forms of metallic securing strip, as will later be pointed out. At the present time it is sufficient to mention that by employing my improved metallic locking strip, it is possible to obtain the effect of a metal molding strip. If preferred, it is possible to obtain the effect of a straight seam without an exposed, intervening metallic molding strip. It is further possible to obtain a bead or riser intermediate two pieces of fabric which is covered with a different contrasting or harmonizing fabric.

It may also be pointed out that, if desired, the molding strip may be curved to any desired configuration so as to obtain different decorative designs.

With the foregoing general remarks in mind, it is an object of the present invention to provide two-tone trim panels of novel characteristics.

It is a further object of the invention to provide novel means for securing two pieces of fabric together.

It is a further object of the invention to provide trim panels characterized by the provision of contrasting or harmonizing fabrics in conjunction with an exposed metallic or fabric covered riser of novel design.

It is a further object of the invention to provide a trim panel provided with reinforcing metallic strips, which also were utilized to interlock adjacent pieces of trim fabric.

It is a further object of the present invention to provide a fabric having a stiff bead permanently united to one edge thereof along a line which may be straight or of predetermined curvature.

Other objects of the invention will be apparent as the description proceeds, and when taken in conjunction with the accompanying drawings, wherein:

Figure 1 is a front elevation of a trim panel obtained by the present invention;

Figure 2 is a section on the line 2—2, Figure 1;

Figure 3 is a front elevation illustrating a somewhat different specific design of trim panel;

Figure 19 is a section on the line 19—19, Figure 1;

Figure 4:
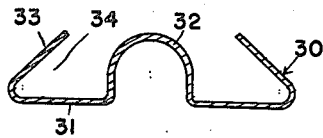
Figures 4 to 10 are diagrammatic views illustrating the steps employed in using my improved construction.

Figures 20 to 23, inclusive, are sectional views illustrating further modified forms of my invention;

Figure 24 is a fragmentary plan view of a somewhat modified strip;

Figure 25 is a section on the line 25—25, Figure 24; and

Figure 26 is an end view looking to the left in Figure 24.

Referring first to Figures 1 and 2, I have illustrated generally at 10 an upholstered trim panel comprising a panel board 11, padding material 12, trim fabrics 13, 14 and 15, and the metallic locking strip 16.

Panels of this type are adapted to be secured to doors of vehicles and it is to be understood that while I have illustrated my invention as applied to a trim panel for attachment to a door, the invention is not thus limited. The invention may be applied to other panels, and in fact, as will be obvious, its application is more or less general. Thus it may be used for decorative trim in vehicles, homes, stores, theatres and the like.

By way of example, the trim panel illustrated in Figures 1 and 2, may be covered by a composite trim fabric made up of the fabric pieces 13, 14 and 15. The upper piece 15 may, for example, be of a dark tone, whereas the pieces 13 and 14 may be of a harmonizing or contrasting color or shade. The metallic strip 16 has a bead or riser 17 intermediate the pieces of fabrics 13 and 14 which is exposed and which may, of course, be chromium plated or otherwise treated to present an attractive appearance.

The details of this construction will later be pointed out.

In Figure 3 I have illustrated a somewhat different design for the purpose of indicating the flexibility of the present invention. In this case the trim panel indicated generally at 20 may be covered with a composite trim fabric comprising an upper portion 21, which may be of a definite color, and a lower portion 22 which may be of a harmonizing or contrasting color. The pieces 21 and 22 are secured together along the line 23, a metallic strip of the type disclosed herein being employed. Intermediate the lower portion 22 I provide a decorative fabric insert 24 which may be of the same color as the upper portion 21, or of a different harmonizing or contrasting color. The lines of conjuncture 25, between the insert 24 and the fabric 22, are formed by metallic strips of the type disclosed herein, as will later be pointed out.

It may be stated at this time that while the invention is most readily practiced in a manner to provide straight-line seams of the conjunctures, it need not be limited thereto, and it is within the contemplation of the present invention that the metallic strip may be curved transversely to provide curved or irregular lines of conjunctures between the various pieces of fabric.

Referring now to Figures 4 to 10, I have illustrated the method of employing the strips. In Figure 4 I have indicated in section a strip 30 which is made of a light bendable metal. I have found that excellent results are obtained where these strips are formed of brass, but it is obvious that any suitable material may be employed. I prefer to employ metal, but it is entirely possible that other materials, such for example as suitable resins, might be employed. Thus, for example, resins might be formed to the same shape as the metallic strips, and the interlock between the fabrics and the strips could be obtained by the application of heat to the resin strips.

I have found that where brass is employed as the material from which the strips 30 are formed, best results are obtained when the strip is between .010 and .015 inch in thickness. Obviously the thickness of the strip is not critical, and will be selected with well-known practice and in accordance with the specific material employed.

The strip 30 illustrated in Figure 4 comprises a generally flat base 31 having a riser portion 32 formed upwardly therefrom. The edges of the base 31 are bent, as indicated at 33, leaving a space 34 beneath the bent edges 33 for the reception of the fabric.

Figure 5:
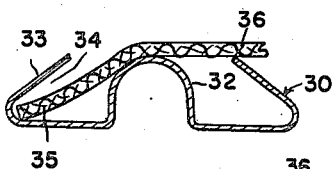

If the riser portion 32 is to be exposed in the completed article, it may be treated to have any desired appearance. Thus, for example, it may be chromium plated to present a silver appearance. If preferred, it may be left natural, and it may be either smooth or provided with a relief pattern. In Figure 5 I have indicated the first step in assembling two separate pieces of fabric with the metal strip 30. In this figure an edge 35 of a fabric 36 is introduced into the space 34 beneath the bent flange 33. The body portion of the fabric 36 at this time extends over the other edge of the strip 30.

Figure 6:
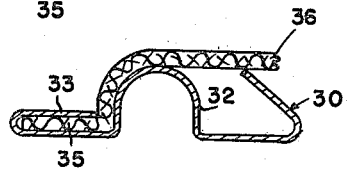

The next step in the operation is indicated in Figure 6 in which the flange 33 has been bent downwardly to clamp the edge 35 of the fabric therebeneath.

Figure 7:
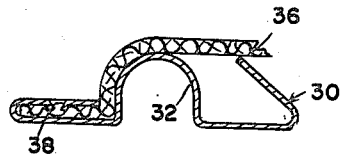
Figure 8:
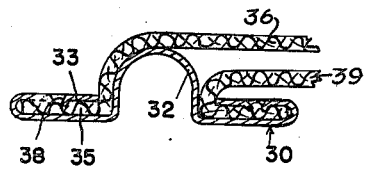

The following step of the operation is indicated in Figure 7, in which the bent flange 33 has been pierced, as indicated at 37, to provide downwardly extending, locking tangs 38, which securely lock the edge 35 of the fabric in place and prevent its accidental withdrawal. The tangs 38 will be provided at suitable intervals as, for example, intervals of one, two, three or four inches.

In Figure 7 I have indicated the tangs 38 as formed by piercing the flange 33. It will be obvious, of course, that the same result may be obtained by piercing the flat base underlying the flange 33 so as to provide upwardly extending tangs. Also, of course, if preferred both the base 31 and the flange 33 may be pierced and the tangs thus provided may be adapted to register or to be spaced from each other.

The operation is repeated at the other side of the strip 30 and a second piece of fabric 39 is secured to the strip. Both pieces of fabric 36 and 39 at this time are extended in the same direction from the strip 30 so as to expose the upper surface of one of the bent edges 33.

Figure 9:
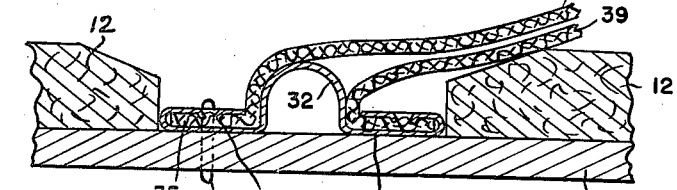

In Figure 9 I have indicated the attachment of the fabric to a panel board 11, which has already been provided with padding material 12. The strip 30 is laid along the desired line of the panel board, and due to its own rigidity will extend in perfectly straight relation thereon. If the strip is curved, it will of course have a definite curvature which may be located as desired on the panel board. The strip 30 is then locked to the panel board 11 by suitable means. For example, it may be merely tacked in place, if desired, the tacks or nails being clamped at the rear of the panel board. In Figure 9, however, I have indicated at 40 staples for securing the strip 30 to the panel board.

It will be understood that the padding material 12 may be of any desired type, and it may be well at this time to mention briefly the construction of the panel. The foundation panel board 11 may be an asphalt board or a panel board sold under the trade name Masonite. The padding material 12 may be wadding of a suitable type, or it may be loosely aggregated cotton, jute, or other fibrous material. The purpose of the padding material is to give an appearance of richness to the completed panel which is otherwise not obtained.

As previously stated, by employing my improved metal locking strip, it is possible to use a lighter gauge panel board 11, for the reason that the metal strip 30 serves as a reinforcing means which strengthens and lends certain rigidity to the panel board. It will be understood, of course, that the light gauge strips 30 are not themselves extremely rigid and will conform to the curvature of the panel board when the same is required to assume a curvature during its application.

Figure 10:
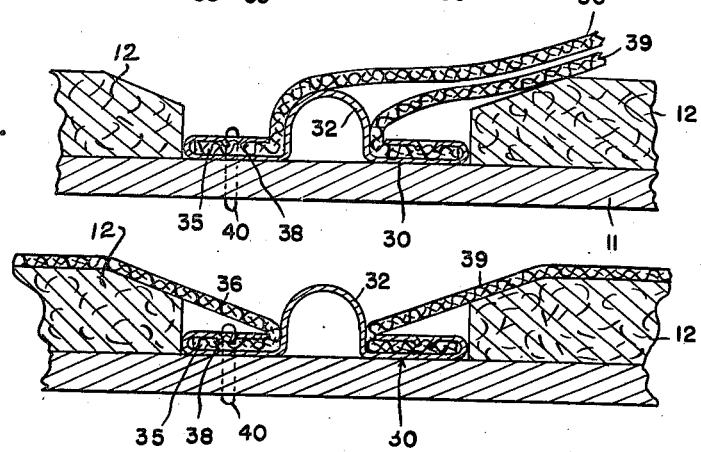

The next step in the operation of applying the fabric to the panel board is indicated in Figure 10 in which the fabrics 36 and 39 have been drawn toward the edge of the panel board, thus exposing the metallic riser 32 which is formed as an integral portion of the strip 30. It will be understood that the riser 32 may be of any desired height or configuration.

As best indicated in Figure 2 previously described, the edges of the fabrics 36 and 39 are bent around the edge of the panel board 11 and secured in place. This may be done manually, and the attachment between the edges of the fabrics 36 and 39 to the rear of the panel board may be accomplished by employing a suitable adhesive.

Figure 11:
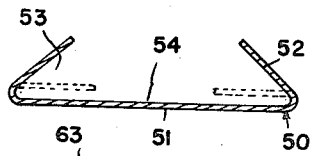
Figure 11 is a sectional view of one form of metal locking strip.

In Figure 11 I have illustrated a slightly different embodiment of my invention. In this figure I have illustrated a reinforcing and locking strip 50, which is identical with that shown in Figure 4, with the exception that the intermediate bead or riser is omitted. The strip 50 comprises a flat base 51 having bent flanges or edges 52 providing openings 53 therebeneath. The edges of the fabric are introduced into the openings or spaces 53 and the flanges 52 are then bent downwardly to the dotted position to lock the edges of the fabric in place. In this modification as in that previously described, preferably the flanges are pierced to provide locking tangs, such as those indicated at 38 in Figure 7.

It will be appreciated, that in this figure the edges of the fabric will be spaced apart and the intermediate portion of the base 51, as indicated at 54, will be exposed between the folded straight edges of the fabric, unless it is covered with a separate piece of fabric, as will later be described.

Figure 12:
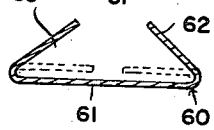
Figure 12 is a sectional view of a somewhat different form of locking strip.

In Figure 12 I have indicated a slightly different embodiment of my invention. In this figure the reinforcing locking strip 60 has a flat base portion 61 and bent flanges 62 providing openings or spaces 63 therebetween. The edges of the fabric are introduced into the openings or spaces, after which the flanges are bent downwardly to the dotted line position, and preferably tangs are provided to lock the fabric in place. This modification differs specifically from that shown in Figure 1 in that when the flanges are bent downwardly to dotted line position, the folded edges of the pieces of fabric secured thereto are substantially abutting so that no material is exposed therebetween.

Figure 13:
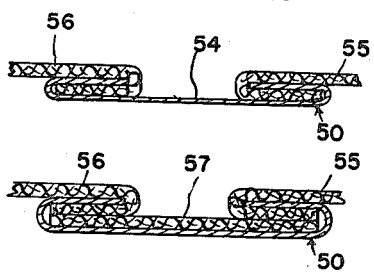
Figures 13 to 18 are sectional views illustrating modified forms of connections between different fabrics.

In Figure 13 I have indicated the locking strip 50, shown in Figure 11, in operative position with a pair of fabrics 55 and 56. It will be apparent that the intermediate portion 54 of the metal strip 50 is exposed between folded edges of the fabrics 55 and 56.

Figure 14:
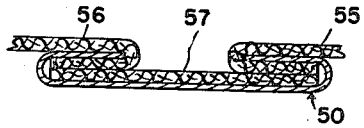

In Figure 14 I have illustrated the locking strip 50 in operative position with a pair of fabrics 55 and 56, with the addition of a third piece of fabric 57 which covers the portion 54 of the strip 50. It will be appreciated that the fabric 57 may be of the same color as the fabrics 55 and 56, or it may be of a harmonizing or contrasting color.

Figure 15:
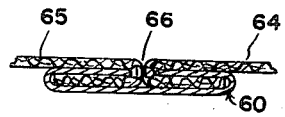

In Figure 15 I have indicated the strip 60 shown in Figure 12 in operative position with a pair of fabrics 64 and 65. It will be observed that the folded edges of fabric, as indicated at 66, are substantially abutting. At the same time this construction avoids the unsightly appearance of sewed seams, so that along the line 66 the fabrics appear to be perfectly straight and evenly tensioned.

Figure 16:
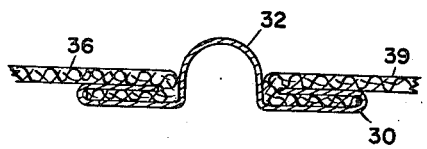

In Figure 16 I have indicated the riser 30, previously discussed, in operative relation with fabrics 36 and 39. In this figure the bead or riser portion 32 is indicated as extending substantially above the planes of the fabrics 36 and 39. As previously stated, this riser may be chromium plated if desired, or provided with a surface adapted to harmonize or contrast in a predetermined manner with the fabrics 36 and 39.

Figure 17:
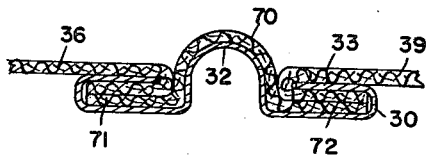

In Figure 17 I have indicated the riser 30 in operative position with trim fabrics 36 and 39, but in this figure the riser portion 32 is covered with a separate strip of fabric 70, whose edges 71 and 72 are locked in place beneath the bent flanges 33 of the locking strip 30.

Figure 18:
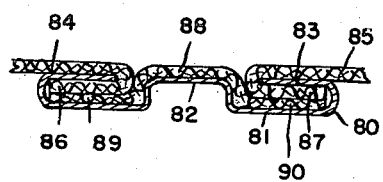

In Figure 18 I have indicated a slightly different embodiment of my invention which the strip 80 is provided with a flat base 81 having upwardly formed beads or risers therein. The bead or riser 82 is of a height so that in the completed trim fabric the upper surface thereof occupies substantially the same plane. The strip 80 is provided with bendable edges or flanges 83, as in the preceding embodiments. In this figure I have indicated trim fabrics 84 and 85 having edges 86 and 87, respectively, turned under and locked beneath the flanges 83. A strip of fabric 88 having edges 89 and 90 is provided, which is adapted to cover the upwardly extending bead or riser 82 formed in the strip 80. The parts are proportioned so that the exposed surface of the strip 88 occupies the plane of the fabrics 84 and 85. In this modification as in all previously described, the flanges 83 may be perforated to provide locking tangs such as indicated at 38 in Figure 7.

In some cases it is preferred not to unite two pieces of fabric by the strips, and I have indicated in Figure 19 an example of this construction. Figure 19 is a section on the line 19—19, Figure 1. In this figure the upper fabric 15 may, if desired, have a separate strip secured thereto, the strip, however, not being clinched or otherwise secured to the lower fabrics 13 and 14.

As previously described in connection with Figure 1, fabrics 13 and 14 are united by the strip 16. These fabrics may be mounted on the board as previously described, after which the fabric 15 may be assembled on the panel board 11. Prior to assembling the fabric 15 to the panel board 11 it is united with a strip 17', which is identical with the strip 30 shown in Figure 4, with the exception that one base portion 31 and one flange portion 33 is omitted. In other words, the strip 17' consists of the riser portion 17'', the base portion 18, and the bent flange 19. As indicated in this figure, one of the fabrics 14 or 15 (herein designated 14) extends downwardly on the panel board 11 beneath the fabric 15. In this figure I have indicated padding material 12, which, as understood, may be supplied or omitted as desired.

The strip 17' is secured to the panel board 11 by any suitable means, and is herein shown as secured thereto by means of clips or staples 40. The strip 17' has sufficient stiffness so that the bead 17'' is retained firmly in position. In addition the strip 17' provides means for insuring that the fabric 15 will present a folded edge adjacent the riser 17" which is smooth and perfectly straight if desired.

Referring to Figure 20 I have indicated a somewhat different embodiment of my invention in which fabrics 100 and 101 are united by means of a metallic strip 102. In this embodiment of my invention the formed bead or riser 103 on the strip 102 is covered by a correspondingly shaped plastic bead 104, which may be of any desired color. The bead 104 is shown as provided with flange portions 105 which are adapted to underlie the bent flanges 106 of the strip 103.

A similar arrangement is illustrated in Figure 21 in which the strip 110 has a flat base, the formed bead being omitted. Fabrics 111 and 112 are united with the strip in the manner previously described. In order to provide an intermediate bead or decorative riser 113, I form the same out of plastic, which in this embodiment is shown as having a solid riser portion.

Substantially the same result may be accomplished with a saving of material, as illustrated in Figure 22, by securing a plastic member 114 in place, the plastic member 114 having a formed hollow bead or riser 115. In this modification as in all previously described, one or more fabrics 116 or 117 are united therewith by means of the strip 118 having bent flanges 119 adapted to clamp the folded edge or edges of the fabrics in place.

In the embodiment illustrated in Figure 23, the construction shown comprises a panel board provided with padding material 121 which is covered with trim fabric 122. It will be understood that a second trim fabric may be employed which may have an edge extending under the edge of the padding material. The metallic fastening element 123 is similar to the element 17 shown in Figure 19, with the exception that the free edge forming the free edge 124 of the bead portion 125 terminates at a point slightly spaced from the panel board 120. The fabric 122 has its edge folded under the flange 126 which is bent down to clamp the fabric in place and which is additionally secured to the panel board by staples or other securing means indicated at 127. I provide a plastic molding strip 128 having a flat edge 129 adapted to be locked beneath the bent flange 126 of the securing strip 123. The plastic molding is additionally formed to interfit with the bead portion 125 of the metallic strip, and it is provided at its opposite edge with an inwardly projecting flange 130 which lies beneath the edge 124 of the metallic strip. As is well-known, plastics suitable for this purpose may be obtained in a wide variety of colors and by the described arrangement it is possible to produce any desired harmony or contrast between the fabrics and the molding strip 128.

In some instances it may be desirable to have the end of the bead exposed in the finished article, particularly where this bead is left uncovered. In this case it is found preferable to finish off the end of the bead as indicated in Figures 24 to 26. In this embodiment the strip comprises the flat base portion 130 having the bent and bendable flanges 131, as in the modifications previously described. The base 130 is bent upwardly as indicated at 132 to provide a bead or riser which, as previously described, may be of stainless steel, chromium plated or otherwise treated or covered. The base 130 including flanges 131 is cut off short of the end of the bead 132 so that the bead projects a short distance therebeyond, as indicated at 133. At the same time the projecting portion 133 of the bead 132 is formed inwardly so as to close the end thereof in the manner indicated in Figure 26. This may conveniently be accomplished by upsetting the molding in a predetermined manner. Instead of rounding the same, it may, if desired, be tapered off flat, or otherwise formed to give any desired decorative or attractive appearance.

The metallic strips thus far described may be very cheaply constructed and the metal employed in them is, of course, very inexpensive. As a result, the material going to make up the trim panel is no more expensive than present day constructions which lack the flexibility of design in the present construction. In addition, the present strips lend themselves to very rapid assembly and do not require highly skilled labor. The method steps indicated in Figures 4 to 10 may be carried out by unskilled labor and the results are uniformly excellent. As a result, the labor costs of assembling the completed panels is no more expensive than present less attractive panels, and is in fact considerably less expensive than present types of assembly which obtain anything like equivalent results.

Reference was previously made to the fact that instead of employing metallic strips, strips of other material could be employed. By employing metallic strips the interlock formed by the tangs 38 is exceptionally efficient, but in its broader aspects, the invention need not be practiced with metallic strips. If a strip of resinous material or adhesive coated, bendable cardboard were employed, it would still be possible to obtain perfectly straight seams having straight folded edges, which is very desirable in this type of construction. If the strips were formed of resinous material, the sealing bond could be obtained by the application of heat to the fabric overlying the folded strips. If adhesive were employed, it would be necessary only to apply sufficient pressure to cause initial setting of the adhesive.

It may also be mentioned that, if desired, rubber may be employed as the locking medium. Thus, for example, the strips may be formed of any suitable material and provided with thin unvulcanized rubber coatings, or provided with a film of vulcanizing latex. The final assembly of the operation would then include the application of heat and pressure to vulcanize the rubber, thus forming a perfect bond between the strips and fabrics.

What I claim as my invention is:

1. Trim comprising a plurality of fabrics, means securing said fabrics together along a seam comprising a strip having reversely bent edge flanges at the rear of said fabrics, said fabrics having adjacent edges reversely bent and clamped in place by the reversely bent edge flanges of said strip, the folds formed by the reversely bent edge flanges of said fabrics being spaced apart to provide a visible area therebetween and said strip being deformed to provide an elevated bead between said folds.

2. As an article of manufacture, for securing two fabrics together, a metallic strip having bendable flanges extending inwardly from opposite edges thereof, said flanges being of a length such that when bent to overlie said strip, the free edges are spaced to expose a visible area therebetween, the central portion of said strip being deformed to provide a raised bead intermediate the said free edges of said flanges.

in bent condition, said bead being closed at one end.

3. As an article of manufacture, for securing two fabrics together, a metallic strip having bendable flanges extending inwardly from opposite edges thereof, said flanges being of a length such that when bent to overlie said strip, the free edges are spaced to expose a visible area therebetween, the central portion of said strip being deformed to provide a raised bead intermediate the said free edges of said flanges in bent condition, said bead extending a short distance longitudinally beyond other portions of said strip and being closed at its extended end.

4. A trim panel comprising a panel board, a molding strip having a bead and an attaching flange having a reversely bent portion, said flange having fastening elements projecting therefrom through said panel board, a piece of cover fabric at one side of said strip secured to said panel board at an edge and having a free edge adjacent said strip, the free edge of said fabric being folded under the reversely bent portion of said flange, the fold of said fabric being in substantial abutment with said bead.

5. A trim panel comprising a panel board, a cover fabric adapted to cover a portion of said panel board, said cover fabric being secured at one edge to an edge of said panel board, a metal strip secured directly to said panel board, a raised bead carried by said strip, a flange extending laterally from said bead, said flange having a reversely bent portion, the opposite edge of said cover fabric being folded under the reversely bent flange portion and clamped thereby between said reversely bent flange portion and the flange proper.

6. A trim panel comprising a panel board, a cover fabric adapted to cover a portion of said panel board, said cover fabric being secured at one edge to an edge of said panel board, a metal strip secured directly to said panel board, a raised bead carried by said strip, a flange extending laterally from said bead, said flange having a reversely bent portion, the opposite edge of said cover fabric being folded under the reversely bent flange portion and clamped thereby between said reversely bent flange portion and the flange proper, the reversely bent flange portion being of such extent that the folded edge of said fabric substantially abuts said bead.

7. A trim panel comprising a panel board, two pieces of trim fabric and a metal strip together arranged to cover a continuous area of said panel board, the outer edges of each of said fabric pieces being secured to said panel board, the inner edges of said fabric pieces being closely adjacent to each other, said metal strip being secured to said panel board and including laterally extending flanges having reversely bent portions, the said inner edges of said fabric pieces being folded under the reversely bent portions of said flanges and clamped thereby against the flanges proper, the said reversely bent portions of said flanges being spaced apart to provide a substantial space between the folded edges of said fabric pieces, and a raised bead carried by said strip between said folded edges.

8. A decorated trim panel comprising in combination, a panel board, a trim fabric overlying a portion of said panel board, said trim fabric being secured adjacent its outer edge to an edge of said panel board, means for securing the inner edge of said trim fabric to said panel board comprising a metal strip directly attached to said panel board, said metal strip having a flange extending under and beyond the inner edge of said trim fabric, said flange having a reversely bent portion, the inner edge of said trim fabric being folded under said reversely bent portion and being clampingly engaged between the said flange of said metal strip and said reversely bent portion thereof, fastening elements concealed by said trim fabric extending through the said reversely bent portion, said folded inner edge of said trim fabric, said flange, and said panel board, said reversely bent portion of said flange forming a ruled guide over which the inner edge of said trim fabric is folded.

9. A trim panel comprising a panel board, a piece of trim fabric tensioned over said panel board and secured at one of its edges to said panel board, a metal strip secured directly to said panel board, said strip having a flat portion the edge of which is reversely bent to form a U-shaped structure whose open side is away from the said one edge of said piece of trim fabric, said piece of trim fabric extending over said reversely bent edge of said strip and folded underneath said reversely bent edge so as to extend into the open side of said U-shaped structure, said reversely bent edge of said strip being in firm, gripping engagement with the folded portion of said trim fabric, and a fastening element concealed by said trim fabric and extending through said U-shaped structure and the fold of trim fabric therein to lock said trim fabric in place and securing said strip to said panel board.

10. A trim panel comprising a panel board, two pieces of trim fabric tensioned over said panel board and secured to said panel board at their outer edges, a metal strip secured to said panel board between said pieces of trim fabric, said strip having flat portions, the edges of said flat portions being reversely bent to define inwardly open U-shaped structures, said pieces of trim fabric each extending over the adjacent reversely bent edge and being folded under said reversely bent edge whereby the folded portion of said fabric extends into the open side of said U-shaped structure, said reversely bent edges of said strips being in firm, gripping engagement with the folded portions of said trim fabrics, and fastening elements concealed by said fabrics and penetrating said flat portions, fabrics and reversely bent edges to lock said folds of trim fabric in place and securing said strip to said panel board.

11. A trim panel comprising a panel board, two pieces of trim fabric and a metal strip together arranged to cover a continuous area of said panel board, the outer edges of each of said fabric pieces being secured to said panel board, the inner edges of said fabric pieces being closely adjacent to each other, said metal strip being secured to said panel board and including laterally extending flanges having reversely bent portions, the said inner edges of said fabric pieces being folded under the reversely bent portions of said flanges and clamped thereby between the reversely bent portions of said flanges and said flanges proper, the said reversely bent portions of said flanges being spaced apart to provide a substantial space between the folded edges of said fabric pieces, and a raised bead carried by said strip between said folded edges.

12. In a trim structure, an elongated base member with its opposite edge portions bent longitudinally toward one another and back upon said base member and substantially parallel therewith to form a pair of spaced fabric clamping devices, a projection thereon between and adjacent the free edges of said edge portions, and fabric having edge portions inserted between said base member and said bent back portions and extending outwardly and reversely around the edge of said bent back portions approximately parallel to its inserted edge portions, said bent back portions being bent into clamping engagement with said fabric edge portions against said base member.

13. In a trim structure, an elongated base member with its opposite edge portions bent longitudinally back toward one another upon said base member to form a pair of spaced fabric clamping devices, said base member between said edge portions being bent to form a ridge therealong, an elongated cover member having a recess extending at least partially around said ridge, and fabric having edge portions inserted between said base member and said bent back portions and extending outwardly and reversely around the edge of said bent back portions approximately parallel to its inserted edge portions, said bent back portions being bent into clamping engagement with said fabric edge portions against said base member.

14. In a trim structure, a foundation member, a strip on said foundation member having lateral flanges provided with open return bent portions, separate trim fabrics extending over different areas of the foundation member and extending over the return bent portions of said strip and having inturned edge portions extending between the return bent portions and lateral flanges of said strips, and anchorage means for said strip and inturned edge portions of said fabrics engaging the foundation member beneath and concealed by the fabrics.

15. In a trim structure, a foundation member, a strip on said foundation member having lateral flanges provided with open return bent portions, separate trim fabrics extending over different areas of the foundation member and extending over the return bent portions of said strip and having inturned edge portions rigidly clamped between the return bent portions and lateral flanges of said strips and anchorage means for said strip engaging the lateral flanges and return bent portions of the strip and the foundation member and located beneath and concealed by the fabrics.

16. In a trim structure, a foundation member, a strip mounted upon said foundation member having lateral flanges provided with laterally spaced open return bent portions, and separate trim fabrics extending over different areas of the foundation member and extending over the return bent portions of said strip and having inturned edge portions rigidly clamped between the return bent portions and lateral flanges of said strips.

17. In a trim structure, a foundation member, separate trim fabrics extending over different areas of said member and having adjacent inturned edge portions, and a connector between said fabrics anchored upon the foundation member, having means clamping the inturned edge portions of said fabrics, and having means providing a molding between the inturned edge portions of said fabrics.

18. In a trim structure, a foundation member, separate trim fabrics extending over different areas of said member and having adjacent inturned edge portions, and a connector between said fabrics anchored upon the foundation member, having cooperating portions concealed by the fabrics and clamping the inturned edge portions of said fabrics, and having means providing a molding between the inturned edge portions of said fabrics.

19. In a trim structure, a foundation member, a sheet metal molding on said member having a central bead and lateral flanges, said flanges having open return bent portions, separate fabrics covering areas of said foundation member upon opposite sides of said molding and extending over said return bent portions, said fabrics having inturned edge portions adjacent the molding clamped between the flanges and return bent portions, and fastening elements for said strip disposed beneath and concealed by the fabrics and engaging the flanges and foundation member.

20. In a trim structure, a foundation member, a sheet metal molding on said member having a central bead and lateral flanges, said flanges having open return bent portions, separate fabrics covering areas of said foundation member upon opposite sides of said molding and extending over said return bent portions, said fabrics having inturned edge portions adjacent the molding clamped between the flanges and return bent portions, means struck from the return bent portions toward said flanges and holding the inturned edge portions of the fabrics against displacement, and fastening elements for said strip disposed beneath and concealed by the fabrics and engaging the flanges and foundation member.

21. In a trim structure, a foundation member, a sheet metal molding on said member having a central bead and lateral flanges, said flanges having open return bent portions, separate fabrics covering areas of said foundation member upon opposite sides of said molding and extending over said return bent portions, said fabrics having inturned edge portions adjacent the molding clamped between the flanges and return bent portions, means between the lateral flanges and return bent portions and constituting integral projections of one of said parts for holding the inturned edge portions of the fabrics against displacement, and fastening elements for said strip disposed beneath and concealed by the fabrics and engaging the flanges and foundation member.

22. In a trim structure, a foundation member, a sheet metal molding on said member having a central bead and lateral flanges, said flanges having open return bent portions, separate fabrics covering areas of said foundation member upon opposite sides of said molding and extending over said return bent portions, said fabrics having inturned edge portions adjacent the molding clamped between the flanges and return bent portions, and a covering for the bead having lateral flanges clamped between the inturned edge portions of the fabrics and the lateral flanges of the molding.

EDWARD R. DETRICK.